T. W. LUCKE.
VEHICLE TIRE.
APPLICATION FILED DEC. 6, 1906.
943,430.
Patented Dec. 14, 1909.
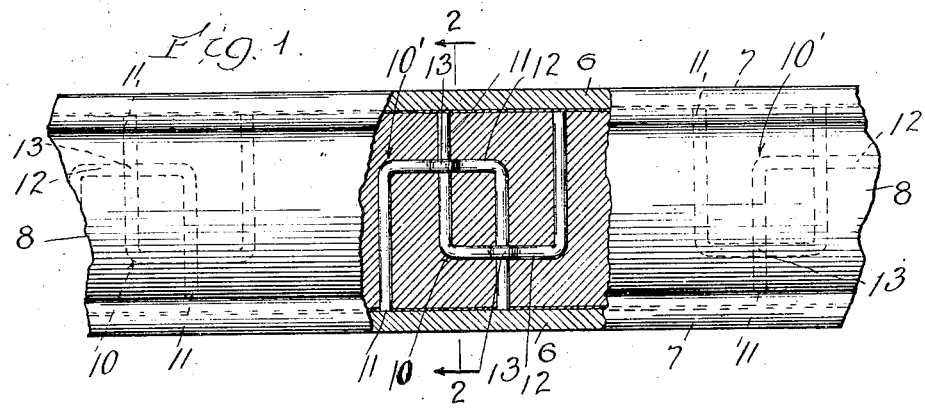
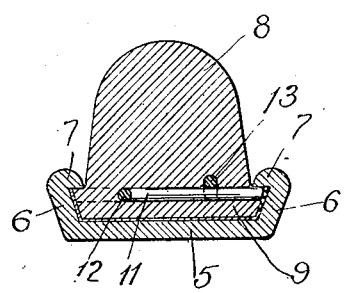
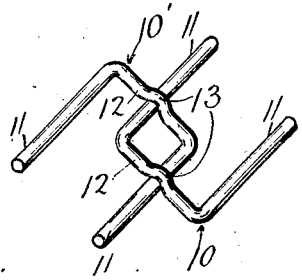
Witnesses:
Ray White
Harry R Lewhite
Inventor
Thomas W. Lucke
By Foree Bain & May Attys

UNITED STATES PATENT OFFICE.

THOMAS W. LUCKE, OF CHICAGO, ILLINOIS.

VEHICLE-TIRE.

943,430.

Specification of Letters Patent. Patented Dec. 14, 1909.

Application filed December 6, 1906. Serial No. 346,539.

*To all whom it may concern:*

Be it known that I, THOMAS W. LUCKE, a citizen of the United States, residing at Chicago, in the county of Cook and State of Illinois, have invented certain new and useful Improvements in Vehicle-Tires, of which the following is a specification.

My invention relates to improvements in vehicle tires, and more particularly to solid, resilient tires of the type applied to channel rims.

One of the salient objects of my invention is to provide a tire of the character described, wherein there is employed no encircling wire.

A further object is to provide a tire of the character described, which may be applied to the rim without the use of special tools, and which may be readily and easily associated with its rim for use.

Another object of my invention is to provide a construction of the character described which will be simple, relatively cheap, and efficient in operation. And still a further object of my invention is to provide fastening means for a tire of the character described, which will operate to effectively retain the tire in position when applied, and which operate to hold the tire at different points independent of each other.

In the drawing wherein I have illustrated an embodiment of my invention: Figure 1 is a plan view, with parts broken away, of a fragment of tire and channel rim. Fig. 2 is a transverse section on line 2—2 of Fig. 1, and, Fig. 3 is a perspective detail of a coacting couple of fastening wires.

Throughout the drawing like numerals of reference refer always to like parts.

In the drawing 5 indicates a channel rim, preferably constructed of metal, and adapted to be applied to the wheel felly in any suitable manner, such channel comprising the flat bottom part adapted to extend across the felly; upturned and preferably outwardly flaring side wings 6; and inturned edge beads or flanges 7—7, preferably having their lower surfaces substantially horizontally disposed and their upper surfaces rounded or inwardly inclined.

8 indicates the tire proper whereof the body may be of any suitable construction and configuration and which preferably is integrally joined with the wider base 9, shaped to snugly fit within the channel rim, and to underlie the flanges 7 when in place therein.

Associated with the base and body, preferably by being integrally molded therein in process of construction of the tire proper, are the retaining wire structures, preferably arranged in couples as shown at 10, 10'. These structures comprise transverse wires of length less than the full width of the base, disposed preferably in a generally horizontal plane, such wires extending each from a side face of the tire base, transversely of the base to a point short of the opposite side face of the base, and such retaining wires being so arranged that some thereof extend to one side face of the base while others extend to the other side face of the base. In the preferred construction each such structure comprises two substantially parallel legs 11—11, connected by an integral connecting bar, or yoke, 12, having at or adjacent its middle a kink or deflection 13. In practice I prefer that such retaining wires be arranged as illustrated in the drawing, that is to say, that two such structures 10, 10' be associated to form a couple, arranged, one with the kink 13 in its yoke 12 receiving a leg 11 of the other member of the couple, and with one of its legs overlain by the kink 13 of the other member of the couple. Such couples or retaining wires are disposed at intervals along the tire and each couple operates independently of the others in performing its attaching functions in connection with the channel rim.

In practice I prefer that the lateral extent of each member of the couple, relative to the tire, be approximately three fourths of the transverse dimension of the tire base.

In use the tire, having embedded therein the attaching wires, is applied to the rim by forcing it into place with a pressure device, or by blows of a mallet. During such operation it will be observed the attaching devices forming a couple may yield inwardly from the normal positions which they occupy when the tire is under its normal tension, the body of rubber between the yoke 12 of such member and the opposite edge of the tire base permitting such yielding movement. It will further be observed, however, that the yokes 12 and kinks 13 in the respective wire members, prevent the latter from being forced bodily into new positions relative to the tire body or base, and afford such a firm grip for the rubber upon the wires as to insure that when the rubber expands, after being compressed in the forcing on of the tire, the retaining wires will be forced outward relative to each other, so as to project beyond the sides of the tire body and to engage under the flanges 7 of the channel rim.

It will be apparent to those skilled in the art, that the mechanical embodiment of my invention may be varied without departure from its spirit and scope, and while I have herein shown for full disclosure a specific embodiment of my invention it will be understood that my invention is not limited thereto in all of its aspects.

Having thus described my invention, what I claim and desire to secure by Letters Patent of the United States, is:

1. In a tire, the combination of a tire body, interlaced U-shaped retaining wires embedded therein extending transversely of the tire body, and each having an end projecting beyond the side edge of the tire body, of coacting retaining means comprising side wings and inturned flanges carried by said wings whereunder the projecting ends of the wires engage.

2. In a tire of the character described, a channel having upturned sides terminating in inturned flanges, combined with a tire comprising a body portion, an extended base portion, and interlaced U-shaped retaining wires in the upper plane of said base portion, said U-shaped wires extending transversely of the tire in opposite directions through less than the full width of the tire base, and at their ends disposed for engagement directly under the opposite flanges of the channel portion.

3. In a tire of the character described, the combination of a tire body, a channel rim having inturned flanges, 7, and retaining means in the tire comprising couples of U-shaped wires, arranged in interlaced relation with their free ends oppositely projecting, each wire having a kink in its yoke-part and one leg lying in the kink in the yoke of the other wire, said couples being embedded in the tire body with their free ends arranged for engagement under the flanges of the rim.

4. In a tire, the combination of a tire body, retaining wires embedded in said body each having a portion extending transversely of the tire body with an end arranged in relation to one side of the body for engagement with a rim-part, said transverse portion of the wire stopping short of the opposite side edge of the body and being suitably deflected to form an abutment which coacts with the solid rubber portion of the body laterally beyond it to prevent permanent shifting of the wire in relation to the tire body, while permitting the rim-engaging end of the wire to yield inward as the solid cushioning part of the tire body is compressed, and a coacting rim having inturned flanges for engagement with the rim-engaging ends of the wires.

In testimony whereof I hereunto set my hand in the presence of two witnesses.

THOMAS W. LUCKE.

In the presence of—
  GEO. T. MAY, Jr.,
  MARY F. ALLEN.